United States Patent
Wu

(10) Patent No.: US 7,102,817 B1
(45) Date of Patent: Sep. 5, 2006

(54) OBJECTIVE LENS DEVICE FOR A MICROSCOPE

(75) Inventor: Paul Wu, Hsinchu (TW)

(73) Assignee: Anmo Electronics Corporation, Hsinchu (TW)

( * ) Notice: Subject to any disclaimer, the term of this patent is extended or adjusted under 35 U.S.C. 154(b) by 0 days.

(21) Appl. No.: 11/334,415

(22) Filed: Jan. 19, 2006

(51) Int. Cl.
*G02B 21/00* (2006.01)
*G02B 23/00* (2006.01)
*G02B 15/01* (2006.01)

(52) U.S. Cl. .................... 359/384; 359/368; 359/425
(58) Field of Classification Search ........ 359/368–390, 359/440–441, 656–661, 694–706, 363, 894, 359/425–426; 356/244
See application file for complete search history.

(56) References Cited

U.S. PATENT DOCUMENTS

| | | | | |
|---|---|---|---|---|
| 4,208,089 A | * | 6/1980 | Netto .......................... | 359/363 |
| 5,241,422 A | * | 8/1993 | Shimada et al. ............ | 359/694 |
| 5,894,346 A | * | 4/1999 | Gu-pin et al. ............... | 356/244 |
| 6,147,797 A | * | 11/2000 | Lee .............................. | 359/363 |
| 6,407,768 B1 | * | 6/2002 | Ishikawa ...................... | 348/79 |
| 6,690,510 B1 | * | 2/2004 | Kanao ......................... | 359/380 |

FOREIGN PATENT DOCUMENTS

JP      52-25653      *   2/1997   .................. 359/368

\* cited by examiner

*Primary Examiner*—Thong Q Nguyen
(74) *Attorney, Agent, or Firm*—Rosenberg, Klein & Lee

(57) ABSTRACT

An objective lens for a microscope has a casing, a telescopic tube assembly and a cap. The casing is tubular and has a through hole and a window. The telescopic tube assembly has an outer tube, an inner tube and an objective lens. The outer tube is mounted rotatably in the casing and has an inner thread and an annular knob aligned with the window. The inner tube mounted rotatably and moveably in the outer tube. The objective lens is mounted in the inner tube. The cap is mounted on the casing and has two guides mounted between the casing and the cap and slidably engaging the inner tube so the inner tube can move along the guides. The magnification and focal length of the microscope changes when the inner tube with the objective lens moves in the outer tube.

3 Claims, 5 Drawing Sheets

OBJECTIVE LENS DEVICE FOR A MICROSCOPE

BACKGROUND OF THE INVENTION

1. Field of the Invention

The present invention relates to an objective lens device, and more particularly to an objective lens device for a microscope that has a telescopic tube assembly with an objective lens and adjusts the magnification and focal length by retracting or extending the telescopic tube assembly.

2. Description of Related Art

Microscopes are used generally for observation microbes, cells or specific material microstructure.

A conventional microscope has a base, an arm, a head, an eyepiece, a turret, multiple object lenses and a stage. The arm is mounted on the base and has a distal end. The head is mounted on the distal end of the arm. The eyepiece is mounted to the head. The turret is mounted rotatably to the head. The multiple objective lenses are mounted to the turret and have different powers. One of the objective lenses can be aligned with the eyepiece by rotating the turret to make the microscope has a specific magnification. The stage is mounted slidably to the arm, is aligned with a corresponding objective lens and has a retainer to hold a target such as glass slides with cells or specific material.

However, each objective lens has an unmodifiable focal length and a specific power that can not be adjusted to change the magnification of the microscope without replacing the objective lens. The microscope with the multiple objective lenses makes its cost high.

Moreover, moving the stage with the target up or down is necessary to precisely match the focal length of the objective lens, besides turning the turret for alignment of the objective lenses. The adjustments of the turret and the stage are inconvenient and inefficient.

To overcome the shortcomings, the present invention provides an objective lens device for a microscope to mitigate or obviate the aforementioned problems.

SUMMARY OF THE INVENTION

The main objective of the invention is to provide an objective lens device for a microscope that has a telescopic tube assembly with an objective lens and adjusts the magnification and focal length of the objective lens by retracting or extending the telescopic tube assembly.

An objective lens for a microscope in accordance with the present invention comprises a casing, a telescopic tube assembly and a cap.

The casing is tubular and has a through hole and a window.

The telescopic tube assembly has an outer tube, an inner tube and an objective lens. The outer tube is mounted rotatably in the casing and has an inner thread and an annular knob aligned with the window. The inner tube mounted rotatably and moveably in the outer tube. The objective lens is mounted in the inner tube.

The cap is mounted on the casing and has two guides mounted between the casing and the cap and slidably engaging the inner tube so the inner tube can move along the guides.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
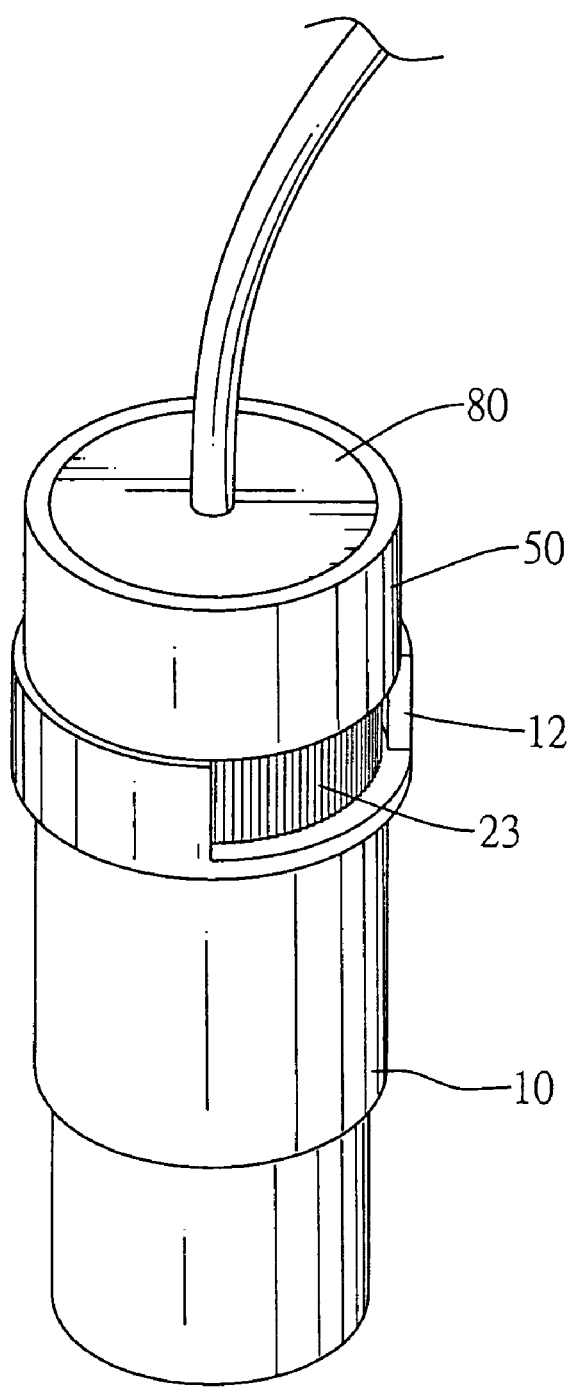
FIG. 1 is a perspective view of an objective lens device for a microscope in accordance with the present invention.
Figure 2:
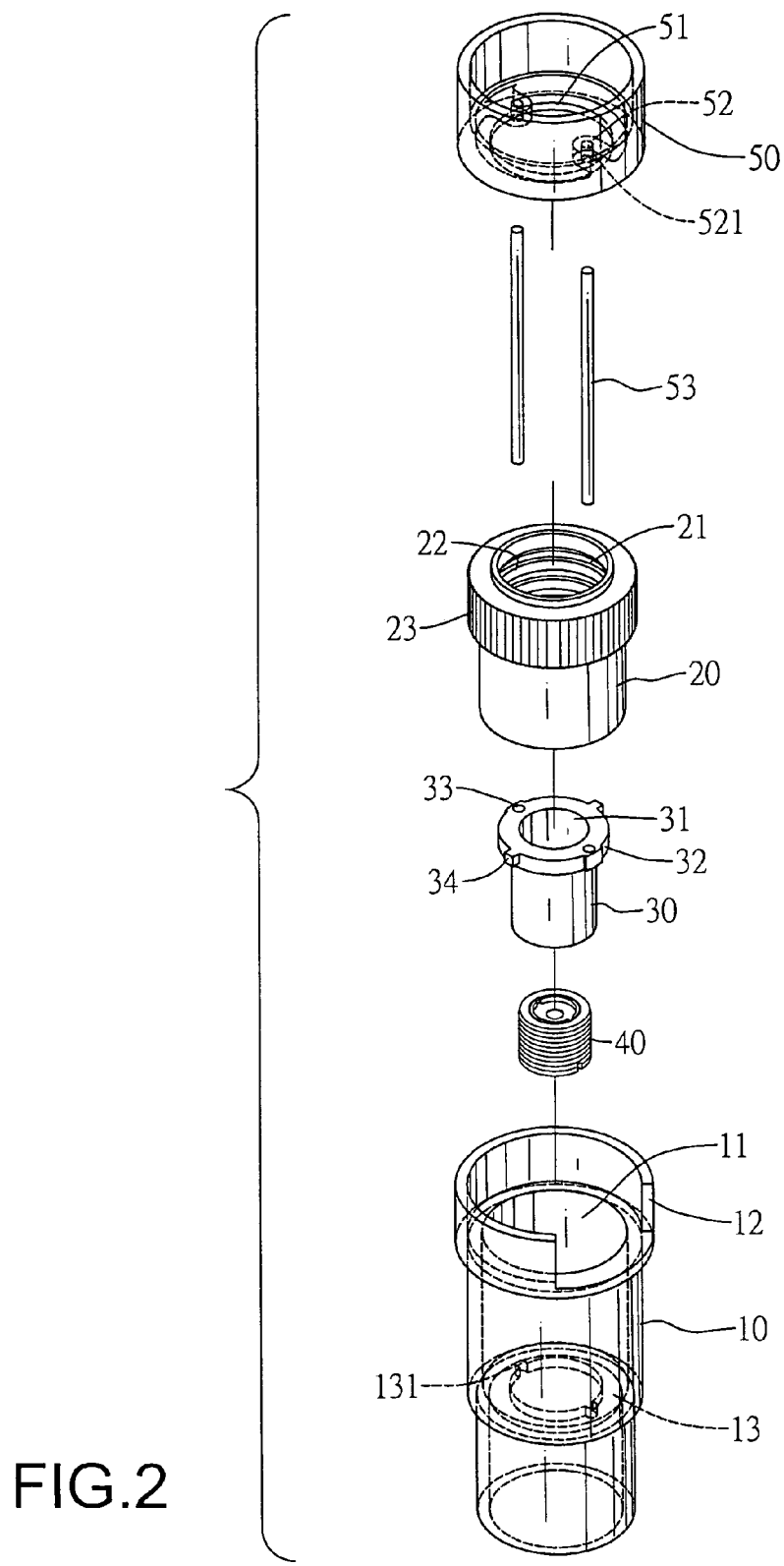
FIG. 2 is an exploded perspective view of the objective lens device in FIG. 1.
Figure 3:
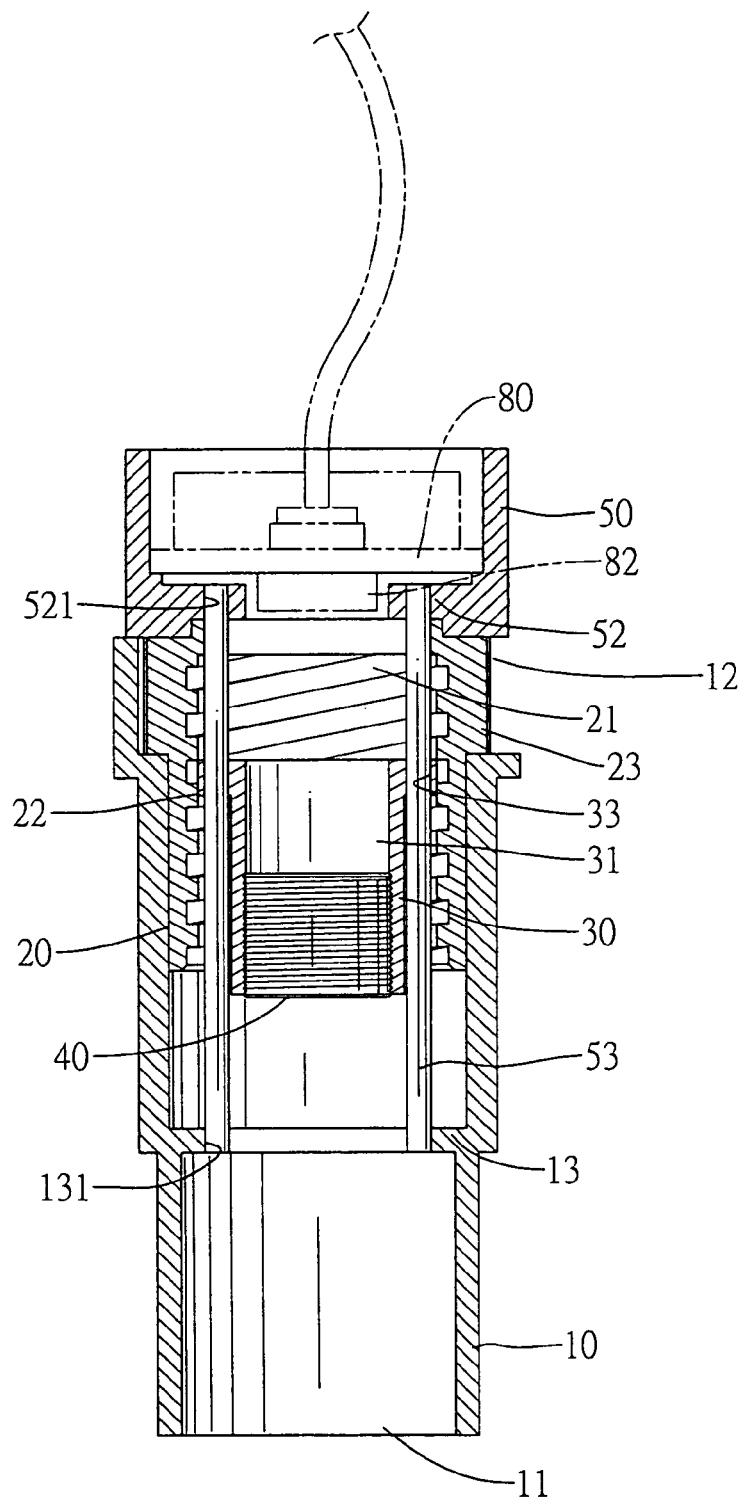
FIG. 3 is a side view in partial section of the objective lens device in FIG. 1.

With reference to FIGS. 1 to 3, an objective lens device in accordance with the present invention is used with a digital microscope. The digital microscope has an optical sensor (80). The optical sensor (80) has a circuit board and an eyepiece (82) mounted to the circuit board.

The objective lens device is connected to the optical sensor (80) so the optical sensor (80) takes images from the objective lens device when the microscope operates. The objective lens device comprises a casing (10), a telescopic tube assembly and a cap (50).

The casing (10) is tubular and has an inner open end, an outer open end, a through hole (11), an inner surface, a window (12) and an annular inner flange (13). The inner open end has an edge. The through hole (11) is defined longitudinally through the casing (10). The window (12) is radially defined through the casing (10) and may be defined in the edge of the inner open end. The annular inner flange (13) extends radially inward from the inner surface of the casing (10) and has an annular inner edge and at least two notches (131) defined in the annular inner edge.

The telescopic tube assembly is mounted in the casing (10) and has an outer tube (20), an inner tube (30) and an objective lens (40). The outer tube (20) is mounted rotatably in the casing (10) and has two open ends, a through hole (21) with an inner surface, an inner thread (22) and an annular knob (23). The through hole (21) is defined longitudinally through the outer tube (20). The inner thread (22) is formed in the inner surface of the outer tube (20). The annular knob (23) extends radially outward from one of the open ends of the outer tube (20) and are aligned with the window (12) in the casing (10).

The inner tube (30) is mounted rotatably in the outer tube (20) and moves longitudinally when the outer tube (20) rotates. The inner tube (30) has two open ends, a through hole (31), an annular outer flange (32), at least two engaging elements and at least two tabs (34). The through hole (31) is defined longitudinally through the inner tube (30). The annular outer flange (32) extends radially outward from one of the open ends of the inner tube (30) and has an outer edge. The at least two engaging elements are defined on the inner tube (30) and may be at least two mounting holes (33) defined through the annular outer flange (32). The least two tabs (34) protrude from the inner tube (30), may be formed on the outer edge of the annular outer flange (32) and engage the inner thread (22) in the outer tube (20) so the inner tube (30) moves longitudinally in the outer tube (20) when the outer tube (20) is rotated by turning the annular knob (23).

The objective lens (40) is mounted in the through hole (31) in the inner tube (30) at the open end opposite to the outer flange (32).

The cap (50) is tubular, is connected to the optical sensor (80) and is mounted securely on the inner open end of the casing (10) so the eyepiece (82) of the optical sensor (80) can take the image from the objective lens (40). The cap (50) has two open ends, a through hole (51), an inner surface, at least two protrusions (52) and at least two guides. The through hole (51) is defined longitudinally through the cap (50) and receives the circuit board of the optical sensor (80) with the eyepiece (82) facing the objective lens (40). The at least two protrusions (52) extend radially inward from the inner surface of the cap (50) and each protrusion (52) has a mounting hole (521) defined through the protrusion (52). The at lease two guides are mounted securely between the casing (10) and the cap (50) and slidably engage respectively the at least two engaging elements of the inner tube (30). The at least two guides may be at least two guiding rods (53) slidably extending respectively through the mounting holes (33) in the inner tube (30) and correspond to the at least two mounting holes (521) in the cap (50) and at least two notches (131) in the casing (10). Each guiding rod (53) has two ends, one end is mounted securely on a corresponding mounting hole (521) in the cap (50) and the other end is mounted securely in a corresponding notch (131) in the casing (10).

Figure 4:
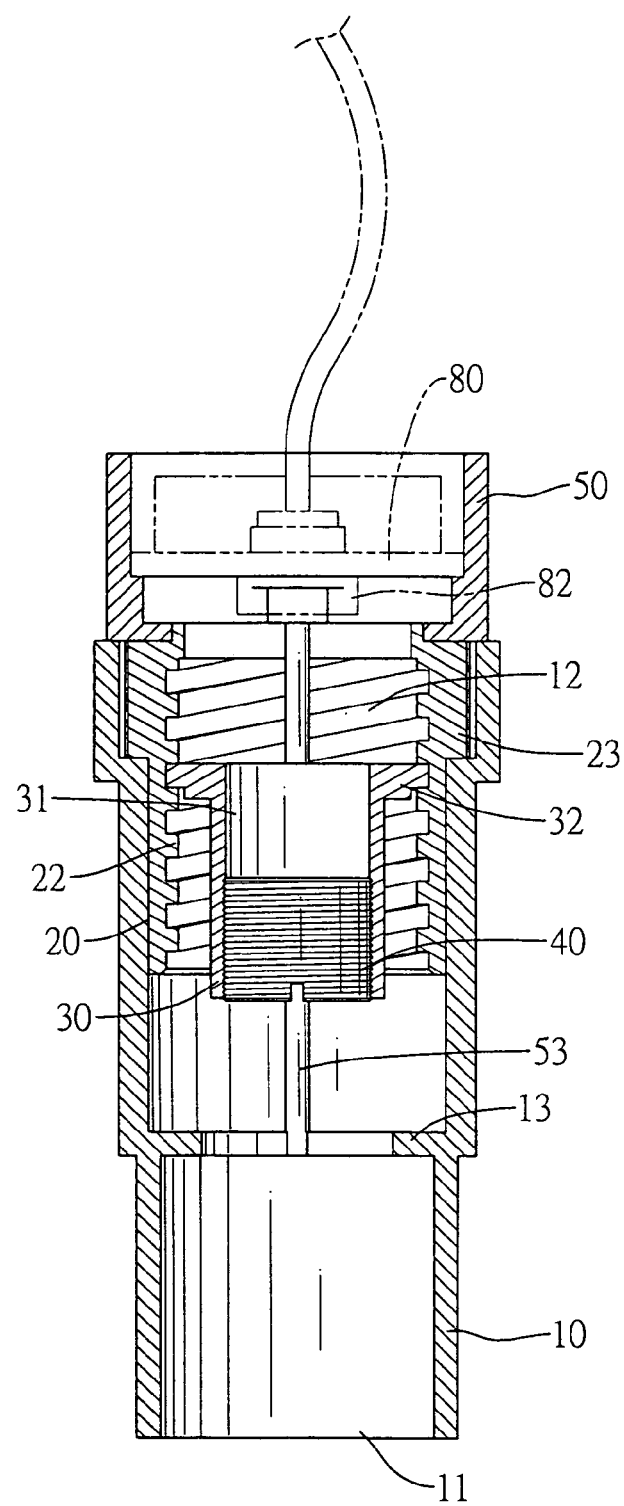
FIG. 4 is an operational side view in partial section of the objective lens device in FIG. 3 with the inner tube being rotated by the knob and moving toward the outer open end of the casing.
Figure 5:
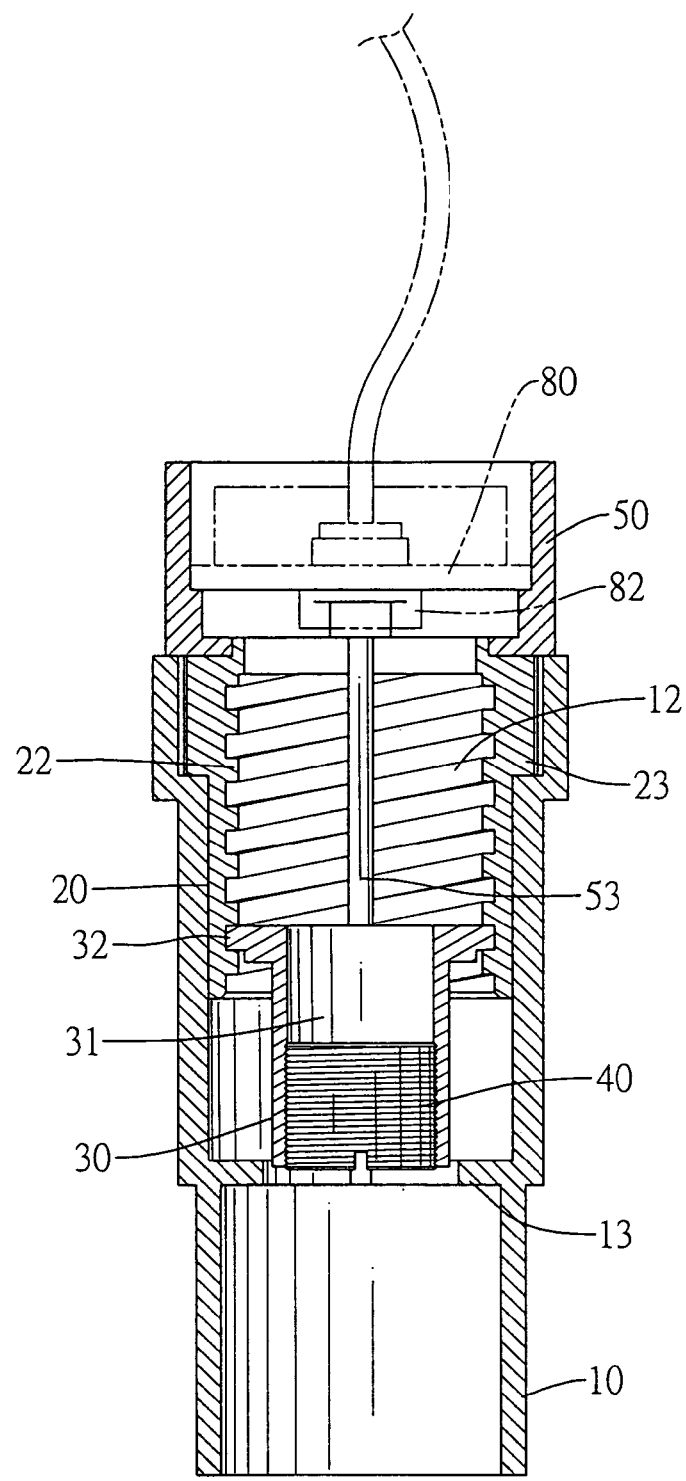
FIG. 5 is an operational side view in partial section of the objective lens device FIG. 3 with the inner tube being located at its lowest position in the casing.

With reference to FIGS. 4 and 5, rotating the annular knob (23) on the outer tube (20) causes the inner tube (30) to slide along the guide rods (53) in the outer tube (20). Therefore, the magnification of the objective lens device can change with the variation of a distance between the eyepiece (82) and the objective lens (40). Moreover, the focal length of the objective lens device can change with the variation of a distance between the objective lens (80) and a target aimed by the objective lens device, such as glass slides with cells or specific material.

The objective lens device changes its magnification and focal length by adjusting the telescopic tube assembly without replacing the objective lens (40) or moving a target aimed by the objective lens device. Therefore, the operation of the objective lens device is convenient and efficient.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An objective lens for a microscope comprising:
    a casing being tubular and having an inner surface, an inner open end having an edge, an outer open end, a through hole defined longitudinally through the casing, an inner surface and a window defined through the casing;
    a telescopic tube assembly mounted in the casing and having
        an outer tube mounted rotatably in the casing and having two open ends, a through hole defined longitudinally through the outer tube, an inner surface, an inner thread formed in the inner surface of the outer tube and an annular knob extending radially outward from one of the open ends of the outer tube and aligned with the window in the casing;
        an inner tube mounted rotatably and movably in the outer tube and having two open ends, a through hole defined longitudinally through the inner tube, at least two engaging elements defined on the inner tube and at least two tabs protruding from the inner tube and engaging the inner thread in the outer tube; and
        an objective lens mounted in said through hole of the inner tube; and
    a cap being tubular and mounted securely on the inner open end of the casing and having two open ends, a through hole defined longitudinally through the cap, an inner surface and at least two guides mounted securely between the casing and the cap and slidably engaging respectively the at least two engaging elements of the inner tube.

2. The objective lens device as claimed in claim 1, wherein:
    the inner tube further has an annular outer flange extending radially outward from one of the open ends of the inner tube and the at least two engaging elements on the inner tube are at least two mounting holes defined through the annular outer flange; and
    the at least two guides are at least two guiding rods slidably extending respectively through the mounting holes in the annular outer flange on the inner tube and each guiding rod has two ends.

3. The objective lens device as claimed in claim 2, wherein:
    the cap further has at least two protrusions extending radially inward from the inner surface of the cap, corresponding the at least two guiding rods and each protrusion having a mounting hole defined through the protrusion;
    the casing further has an annular inner flange extending radially inward from the inner surface of the casing and having an annular inner edge and at least two notches defined in the annular inner edge and corresponding the at least two guiding rods;
    one end of the each guiding rod is mounted securely in the mounting hole in a corresponding protrusion on the cap and the other end is mounted securely in a corresponding notch in the annular inner flange in the casing.

* * * * *